(12) United States Patent
Passarotto et al.

(10) Patent No.: US 7,137,671 B2
(45) Date of Patent: Nov. 21, 2006

(54) ATTACHMENT SYSTEM FOR THE SPOKES OF A BICYCLE WHEEL

(75) Inventors: Maurizio Passarotto, Rovigo (IT); Davide Urbani, Montecchio Maggiore (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 11/044,855

(22) Filed: Jan. 27, 2005

(65) Prior Publication Data

US 2005/0161997 A1 Jul. 28, 2005

(30) Foreign Application Priority Data

Jan. 27, 2004 (EP) .................................. 04425047

(51) Int. Cl.
*B60D 1/02* (2006.01)
(52) U.S. Cl. ..................... 301/58; 301/95; 301/104; 29/894.333
(58) Field of Classification Search .................. 301/58, 301/95, 61, 104, 95.104, 79, 95.106; 29/894.3, 29/894.333
See application file for complete search history.

(56) References Cited

U.S. PATENT DOCUMENTS 5,975,646 A 11/1999 Campagnolo
6,036,279 A * 3/2000 Campagnolo ................. 301/55
6,497,042 B1 * 12/2002 Dietrich ................... 29/894.333
6,776,460 B1 * 8/2004 Lo ............................... 301/58
2001/0019222 A1 9/2001 Campagnolo
2003/0062762 A1 4/2003 Dietrich

FOREIGN PATENT DOCUMENTS

| DE | 100 02 527 A1 | 7/2001 |
|---|---|---|
| DE | 10002527 A1 * | 7/2001 |
| EP | 0 295 194 A1 | 12/1988 |
| EP | 0295194 A1 * | 12/1988 |
| EP | 0 896 886 | 2/1999 |
| EP | 1 101 631 A1 | 5/2001 |
| EP | 0 838 352 B1 | 10/2001 |
| EP | 1 167 078 A1 | 1/2002 |
| EP | 1 231 077 A2 | 8/2002 |
| EP | 1 418 064 A1 | 5/2004 |
| EP | 1418064 A1 * | 5/2004 |
| FR | 997 154 A | 1/1952 |

* cited by examiner

*Primary Examiner*—Frantz F. Jules
(74) *Attorney, Agent, or Firm*—Volpe and Koenig, P.C.

(57) ABSTRACT

An element for the attachment of a spoke in a bicycle wheel at a seat hole has a body, an axial hole, and can engage a tool. The body is of greater transverse size than a seat hole, and abuts the seat hole at a first end of the body. The axial hole extends from the first end in the body and engages a spoke. The element engages a tool at a second end of the body opposite the first end. Finally, the maximum transverse size of said body is defined by side surface portions of said body other than the area of the second end that engages the tool.

16 Claims, 10 Drawing Sheets

ATTACHMENT SYSTEM FOR THE SPOKES OF A BICYCLE WHEEL

FIELD OF INVENTION

The present invention concerns an attachment system for the spokes of a bicycle wheel, in particular a spoke attachment element for a bicycle wheel, a bicycle wheel rim configured for use with a plurality of such spoke attachment elements and a bicycle wheel comprising a plurality of such spoke attachment elements, as well as another spoke attachment element.

BACKGROUND

A spoked bicycle wheel comprises a peripheral crown or rim for assembling a tire, a central hub to be rotationally assembled on the bicycle frame and a plurality of spokes extending between the rim and the hub.

A bicycle spoke has an elongated body having two ends. In order to be able to assemble the spoke tensioned between the hub and the rim, each of the two ends has a head transversally projecting from the elongated body or else a threading. Typically, an end of the spoke has a projecting head and the opposite end has an outer threading. This configuration is, indeed, preferable since, whereas the end of the spoke provided with the head engages in a suitably shaped seat, on the side of the hub or of the rim, respectively, the screwing depth of the threaded end in an internally threaded seat hole on the side of the rim or of the hub, respectively, allows the fine adjustment of the spoke tension during the assembly step and in the use of the bicycle.

A first type of spoke commonly used is made of steel. The threaded end has a diameter on the order of 2–3 mm. A second type of spoke commonly used is made of aluminum. In this case, the threaded end must have a diameter on the order of 4–6 mm to have characteristics of mechanical strength equal to those of a steel spoke.

Bicycle rims shaped as a single channel are known, with the side walls or fins of which the beads of the tire are coupled through lips protruding from the fins, and on the bottom of which a plurality of seat holes for the attachment of the spokes are made. Rims of such a type have little structural stiffness and thus greater deformability from lateral loads.

To increase the structural stiffness and reduce the deformability from lateral loads, bicycle rims are also known whose cross section defines a radially outer circumferential channel for coupling with a tire and an essentially hollow radially inner circumferential body region, hereafter referred to as "spoke attachment chamber". The tire coupling channel and the body region are separated by a wall referred to in the field and hereafter as "upper bridge".

Whereas the channel is subject to standards or restrictions in shape and tolerance in view of its coupling with the tire, the radially inner region can have the most various configurations, provided that it offers an attachment surface for the spokes that is suitable in shape and orientation with respect to the axis of the wheel.

Typical configurations of a bicycle rim of this second known type include an upturned A-shaped cross section, i.e. where the radially inner body region is formed from a single chamber, defined by the upper bridge, two side walls and a radially inner circumferential wall, also referred to as "lower bridge". The chamber can have an essentially rectangular cross section, i.e. wherein the side walls are substantially parallel to the middle plane of the rim, essentially trapezoidal, symmetrical with respect to the middle plane of the rim, i.e. in which the side walls are oblique, or else asymmetrical, essentially trapezoidal, i.e. wherein a first side wall substantially extends in a plane parallel to the middle plane of the rim and a second wall extends obliquely. In other configurations, the radially inner region is provided with one or more partition walls, extending substantially parallel to the upper bridge or substantially normal to it, so as to define two or more circumferential spoke attachment chambers.

Rims of this type can be made by casting of carbon fiber or by extrusion, calandering and joining the ends of a metallic profile, typically made of aluminum.

The seat holes in the rim and in the hub of a wheel can be configured for direct attachment of the spoke, by respectively having an inner threading for engagement of the threaded end of the spoke, or a shaping matching the projecting head of the spoke, as a seat for engagement thereof. However, more typically a spoke attachment element is used with the spoke and a seat hole at the rim and/or the hub.

SUMMARY

The present invention is, in particular, related to rims provided with an upper bridge, although use of a spoke attachment element according to the invention in a single channel rim, as well as at the hub of the wheel, is not ruled out.

The technical problem at the basis of the present invention is to provide an attachment system for spokes in a bicycle wheel that is improved with respect to previously known systems.

As a secondary object, the spoke attachment system according to the embodiments herein should involve the need for simple non-threaded seat holes which are of an as small as possible size, above all in view of the use of aluminum spokes, still allowing easy assembly and adjustment of the tension of the spokes.

The aforementioned problem is solved by a spoke attachment element that is of the nut-type and that is configured to be maneuvered at the head end surface by a tool that does not project transversally from the attachment element itself. The nut-type configuration requires a seat hole even substantially smaller in size with respect to the seat hole necessary for housing the shank of a spoke attachment element provided with such a shank, an advantageous aspect since making holes in the rim decreases its characteristics of mechanical strength. From this point of view, the spoke attachment element according to the invention is particularly advantageous in the case of aluminum spokes. The inventive configuration of engagement with the tool in turn allows the size of the access opening made in the upper bridge of a rim with a complex section to be minimized.

BRIEF DESCRIPTION OF THE DRAWING(S)

Further characteristics and advantages of the present invention shall become clearer from the following detailed description of some preferred embodiments thereof, made with reference to the attached drawings, wherein the same or analogous elements are indicated with the same reference numerals. In the drawings.

DETAILED DESCRIPTION OF THE PREFERRED EMBODIMENT(S)

Introduction to the Embodiments

A first type of spoke attachment element is called "shank-type spoke attachment element" in the remainder of the description and in the claims, and is also referred to in the field as "outer nipple", whereas a second type is called "nut-type spoke attachment element" or in short "nut" in the remainder of the description and in the claims, and is also referred to in the field as "inner nipple".

Before illustrating such types of spoke attachment elements it is worth highlighting that in the field a classification of the spoke attachment elements that uses a nomenclature partially interfering with the one adopted above is also in use. According to such a classification, the spoke attachment elements are indicated as "nipples" if they allow the adjustment of the tension of the spoke, or else as "barrels" if they do not.

In the present description and in the attached claims, under the expression "nipple-type coupling", in particular with reference to a spoke attachment element, it is meant to indicate that the hole for the attachment of the spoke is an entirely threaded through hole or in any case it is a hole, whether a blind or a through one, having a threading length that is greater than the threading length of the spoke, so that the tension of the spoke can be changed by changing the screwing depth of the spoke; under the expression "barrel-type coupling", in particular with reference to a spoke attachment element, on the other hand, it is meant to indicate that the hole for the attachment of the spoke has a threading of a length equal to the threading of the spoke and typically is blind, or else has an undercut recess for bayonet engagement of a projecting head of the spoke.

A shank-type spoke attachment element has a head of greater transverse size than the seat hole and a shank of slightly smaller transverse size than the seat hole, in which a threaded hole extends for the screwing in of a threading of a spoke or a hole for bayonet engagement of a projecting head of a spoke. In the assembled state, the shank passes through the seat hole, whereas the fitting surface between head and shank comes into abutment against the lower bridge of the rim or a wall of the hub in which the seat hole is made, therefore counteracting the tensile stresses of the spoke.

A nut-type spoke attachment element lacks a shank and therefore its entire body, having a greater transverse size than the seat hole of the rim, operates in abutment around the seat hole. In particular, in the case of attachment to a rim provided with an upper bridge, the body of the nut is entirely housed inside the spoke attachment chamber.

The invention concerns, in a first aspect thereof, an element for the attachment of a spoke in a bicycle wheel at a seat hole, comprising:

a body of greater transverse size than that of the seat hole for abutment about the seat hole at a first end, an axial hole extending from the first end in said body, having means for engagement with a spoke, surface tool engagement means at a second end of said body opposite said first end, wherein the maximum transverse size of said body is defined by side surface portions of said body other than tool engagement surfaces, whereby, in use, the tip of the tool does not transversally project from the body of the spoke attachment element.

In the present description and in the attached claims, the expressions "for the abutment", "come into abutment", "operate in abutment" and the like are meant to cover the case in which there is no direct contact between the spoke attachment element and the wall of the rim or hub, rather there is interposition of a brass.

In some embodiments, the tool engagement means comprises a seat at least partially recessed in the surface of said second end. This, as well as contributing to lightening the spoke attachment element and therefore a wheel that comprises a plurality thereof, allows optimal coupling with the tightening/adjustment tool of the spoke attachment element itself.

Advantageously, the tool engagement means extends in a portion of the body axially distinct from a portion of the body comprising said axial hole. In such a way, the configuration of the axial hole can be designed independently of the design of the tool engagement means, in particular it is avoided that the end of a spoke fully engaged in the spoke attachment element interferes with the maneuvering tool and is damaged by it.

In a first embodiment, the tool engagement means comprises a recessed hexagonal seat. By providing for such a seat, the spoke attachment element is easy to be maneuvered with a conventional tool, a so-called key or wrench for screws with a recessed hexagonal head (Allen wrench).

In a second embodiment, the tool engagement means comprises an ordered arrangement of recesses along the periphery of said second end surface of the body. The recesses can be notches extending in a peripheral collar projecting from the second end surface along one or two diametric directions for engagement with a screwdriver, or else differently shaped recesses for engagement with a maneuvering tool having a tip with an ordered arrangement of matching projections.

The tool could be centrally bored and thus allow the tightening/adjustment of a spoke whose threaded end projects from the nut.

In a third embodiment, the tool engagement means comprises at least one diametric notch for a screwdriver on the surface of the second end of the body. Also in this case, the spoke attachment element is easy to be maneuvered with a conventional tool, namely a screwdriver, with a flat tip or a cross-shaped tip.

In other embodiments, the tool engagement means comprises at least one protrusion projecting from the surface of said second end of the body. This configuration, even if at the expenses of a larger axial size of the spoke attachment element, can be advantageous with respect to recessed seats since conventional tools (gripping on the outside) can be used.

In an embodiment, the tool engagement means comprises a single central projecting protrusion. By providing, for example, for a protrusion with a hexagonal section, the spoke attachment element is easy to be maneuvered with a conventional tool, a so-called box or socket wrench. Alternatively, the protrusion can have a square or polygonal section with any number of sides.

In an alternative embodiment, the tool engagement means comprises an ordered peripheral arrangement of protrusions, for example cylindrical, for engagement with a maneuvering tool having a tip with an ordered arrangement of matching recessed seats.

In an embodiment, to receive an aluminum spoke, the axial hole has a transverse size comprised between 4 and 6 mm.

In an alternative embodiment, to receive a steel spoke, the axial hole has a transverse size comprised between 2 and 3 mm.

The axial hole can have an undercut region for bayonet engagement of a head of the spoke, in such a way accomplishing a coupling with the spoke of the barrel type.

In an alternative embodiment, the axial hole has an inner threading extending for at least one axial portion thereof, in such a way accomplishing a coupling with the spoke of the barrel type or nipple type, according to the length of the threading with respect to that of the end of the spoke.

The at least partially internally threaded axial hole can be a through hole or can be blind.

Advantageously, the spoke attachment element can comprise an undercut annular seat in the at least partially internally threaded axial hole, to receive a plastically deformable annular element.

Preferably, according to the invention, the undercut annular seat is formed in an axially intermediate position of the body.

In the present description and in the attached claims, under the expression "axially intermediate position" it is meant to indicate any position spaced from the first and second end of the body, not necessarily equally spaced from said ends.

The arrangement of the insert in an intermediate position of the spoke attachment element allows to avoid some of the drawbacks that the Applicant has noted can occur if the deformable insert is positioned at the head end of the spoke attachment element. Indeed, the Applicant observes that with an arrangement at the head end there is the possibility that during the tensioning of the spoke the insert comes out from its seat and/or is damaged by the surface of the maneuvering tool. In the inventive arrangement, conversely, the insert is more securely longitudinally held and is also more protected against atmospheric agents.

In particular, the undercut annular seat can be in an axially intermediate position between a body portion having said tool engagement means and a body portion having said axial hole.

Even more preferably, according to the invention, the undercut annular seat is in an intermediate position of the threading of the axial hole.

Whereas in the arrangement adjacent to the threading of the spoke attachment element, the insert fully carries out its action only if the spoke is fully screwed in, whereas in other tension adjustments its area of engagement with the deformable insert can be of zero length or in any case of very short length, in the case of an intermediate arrangement along the threading according to the invention, the action of the deformable insert is not dependent upon the screwing depth, and therefore is not dependent upon the tension of the spoke.

It is worth highlighting that the arrangement of the insert in intermediate position along the threading of the spoke attachment element, and more generally its arrangement not at the second end of the spoke attachment element, constitutes a per se inventive aspect, also practicable in a shank-type attachment element and independently of the configuration of the tool engagement means, as described later on.

A plastically deformable annular element can be housed in the undercut annular seat. Such an annular element can be threaded during the assembly of the spoke. Alternatively, in the plastically deformable annular element an inner threading can be previously made, that is contiguous and identical to the threading of the axial hole.

Advantageously, a spoke attachment element according to the present invention can further comprise a brass for abutment about the seat hole, removably associated with the first end of the body. The use of such an abutment brass allows the friction between the abutment surface of the spoke attachment element and the rim or the hub of the wheel to be reduced.

Preferably the abutment brass is shaped like a bored spherical cap, so as to ease the orientation of the spoke attachment element along the intended assembly direction of the spoke, a direction which typically deviates from the direction of a geometric radius of the wheel.

In a second aspect thereof, the invention concerns a bicycle wheel rim intended for co-operation with a plurality of spoke attachment elements as described above, comprising:

a radially inner circumferential spoke attachment chamber, a radially outer circumferential tire coupling channel, said chamber and said channel being separated by an upper bridge, said chamber having a plurality of seat holes each for attachment of a first end of a spoke through a respective spoke attachment element, said upper bridge having a plurality of access openings, each at one of said seat holes, wherein the transverse size of said access openings is slightly greater than a maximum transverse size of the body of the spoke attachment elements.

Advantageously, at each of said seat holes, the wall of said chamber is in the shape of a spherical cap with the concavity facing towards the tire coupling channel, in order to ease the orientation of the spoke attachment element along the intended assembly direction of the spoke, possibly in co-operation with the spherical cap brass of the spoke attachment element.

In a third aspect thereof, the invention concerns a bicycle wheel comprising:

a plurality of spokes, a rim provided with seat holes for attachment of a first end of each of said plurality of spokes, a central hub provided with seat holes for attachment of a second end of each of said plurality of spokes, and a plurality of spoke attachment elements according to the invention, each at a seat hole selected from the seat holes of said rim and the seat holes of said hub.

Preferably, the rim can be as defined above, the spoke attachment elements of the invention being used for the attachment of the spokes on the rim side.

In an embodiment, the spokes are made of aluminum.

In a different embodiment, the spokes are made of steel.

In a fourth aspect thereof, the invention concerns an element for the attachment of a threaded end of a spoke in a bicycle wheel at a seat hole, having a body provided with:

an abutment surface for holding at least one portion of the body at the seat hole, an axial hole having an inner threading extending for at least a portion of its length, an annular seat undercut in the axial hole, and a plastically deformable annular element housed in the annular seat and having a hole coaxial with the axial hole, wherein the undercut annular seat is in an axially intermediate position of the body.

The plastically deformable annular element can comprise, before or after the assembly of the spoke, an inner threading contiguous and identical to the threading of the axial hole.

Advantageously, the undercut annular seat is in an axially intermediate position of the inner threading.

In a first embodiment, the abutment surface is an end surface of the body, in other words the spoke attachment element is of the nut type.

In a second embodiment, the spoke attachment element is of the shank type, namely the body comprises a head and a shank, the fitting surface between head and shank being the abutment surface.

In such a case the annular seat is preferably in the head portion of the spoke attachment element.

Advantageously, the abutment surface is shaped like a spherical cap.

Advantageously, moreover, the spoke attachment element comprises a bored spherical cap brass at the abutment surface.

DESCRIPTION OF THE EMBODIMENTS

Figure 1:
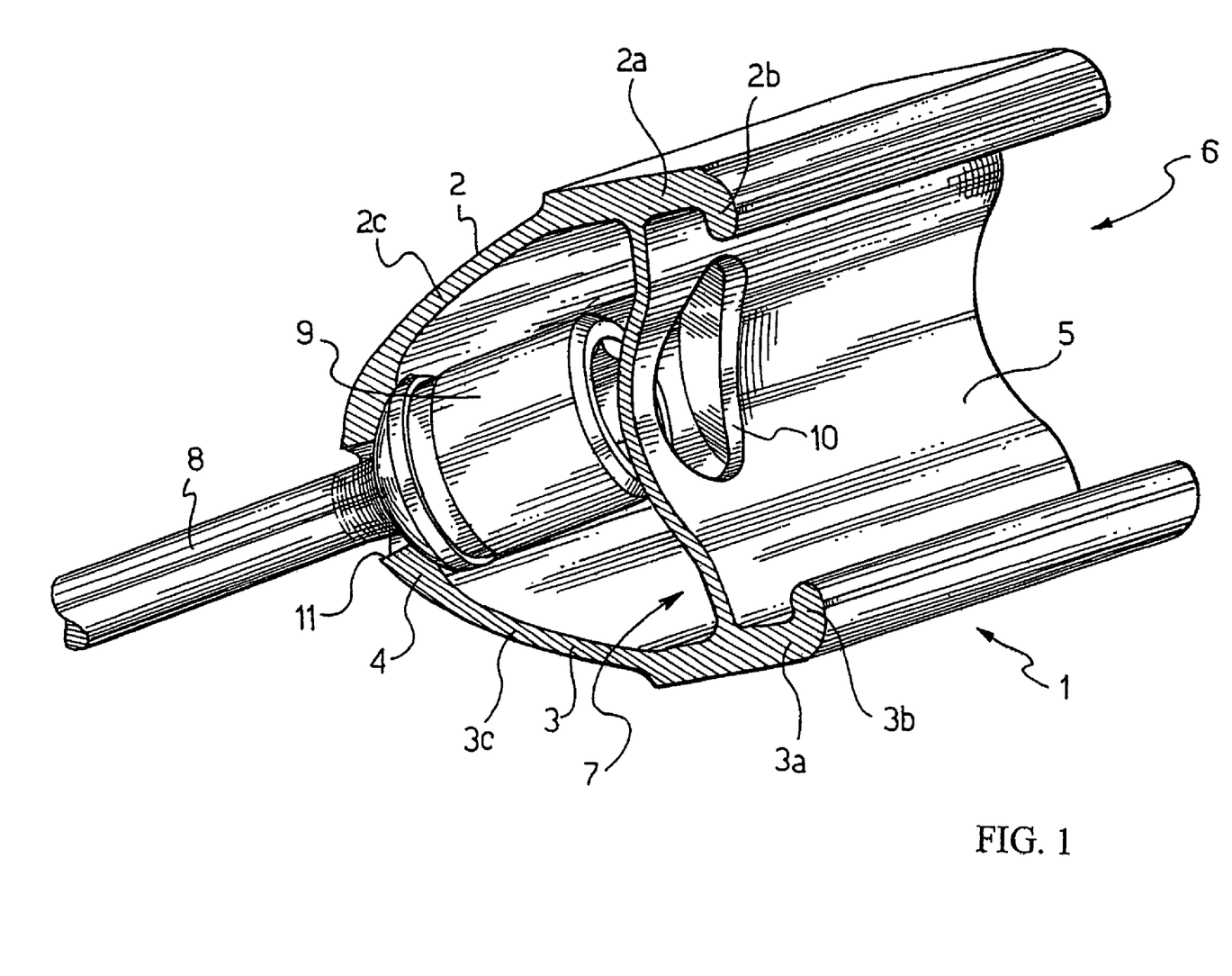
FIGS. 1 and 2 illustrate an attachment system of spokes to a rim of a bicycle wheel according to the present invention.
Figure 2:
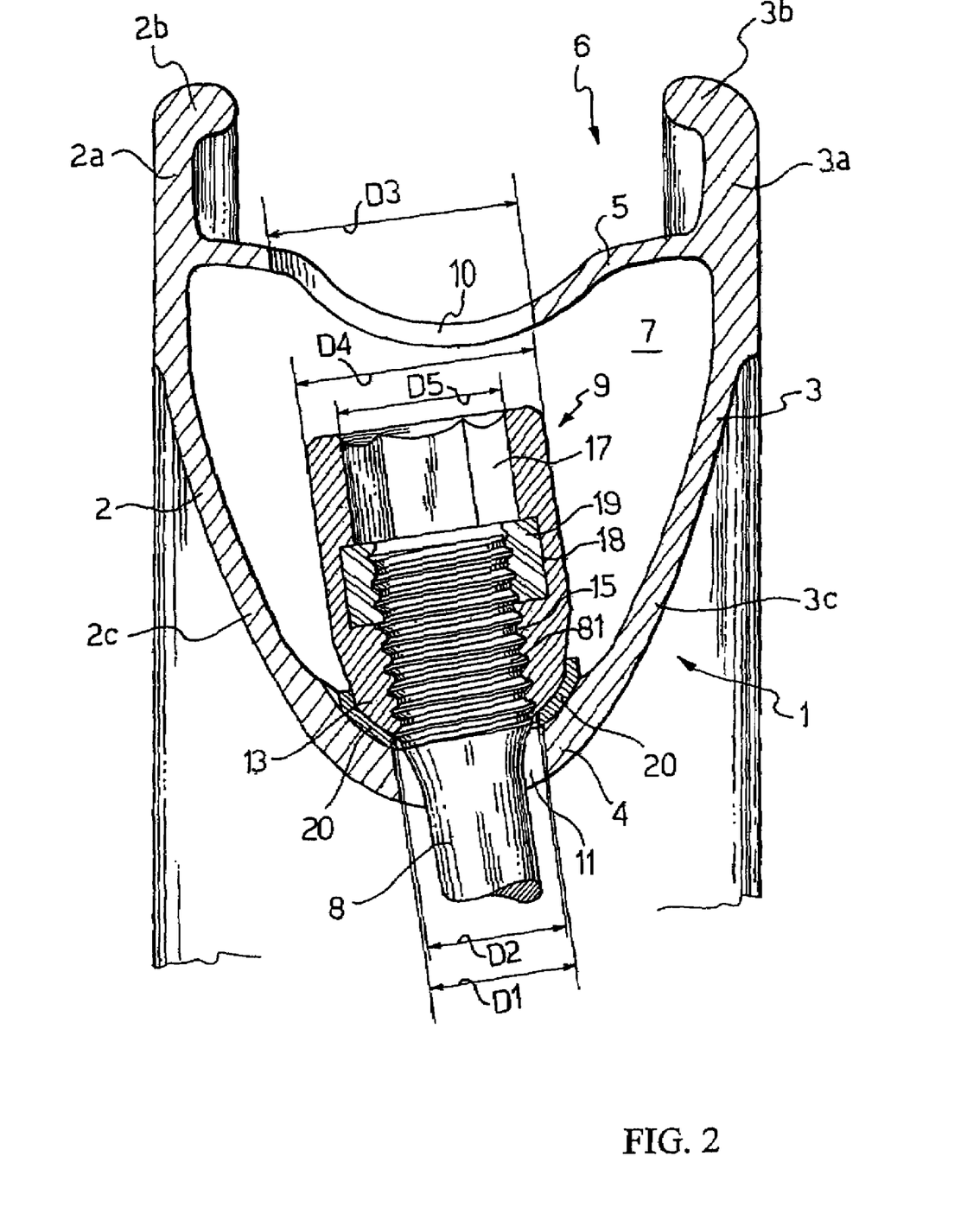

In FIGS. 1 and 2 a portion of a rim 1 of a spoked wheel for a bicycle according to an aspect of the present invention is schematically illustrated in a perspective view.

The rim 1 consists of a profile, typically obtained by extrusion of steel or aluminum and its alloys or magnesium and its alloys, or else it is made of carbon fiber by casting, or is obtained in other per se known ways.

The rim 1 is formed from two side walls 2, 3 connected or fitted at an end by a circumferentially inner wall or lower bridge 4 and connected at an intermediate point by a circumferentially outer wall or upper bridge or partition 5, so as to have a cross section that is substantially in the shape of an upturned "A".

The circumferentially outer portions 2a, 3a of the side walls, or fins 2a, 3a, typically provided with a lip 2b, 3b, form a tire coupling channel 6 with the upper bridge or partition 5. More specifically, the tire, not illustrated for reasons of clarity, is coupled in the tire coupling channel 6 by inserting its beads in the fins 2a, 3a, the lips 2b, 3b acting to hold the beads in a per se known way.

The circumferentially inner portions 2c, 3c of the side walls 2, 3 form, with the lower bridge 4 and the upper bridge 5, a spoke attachment chamber 7.

Figure 2A:
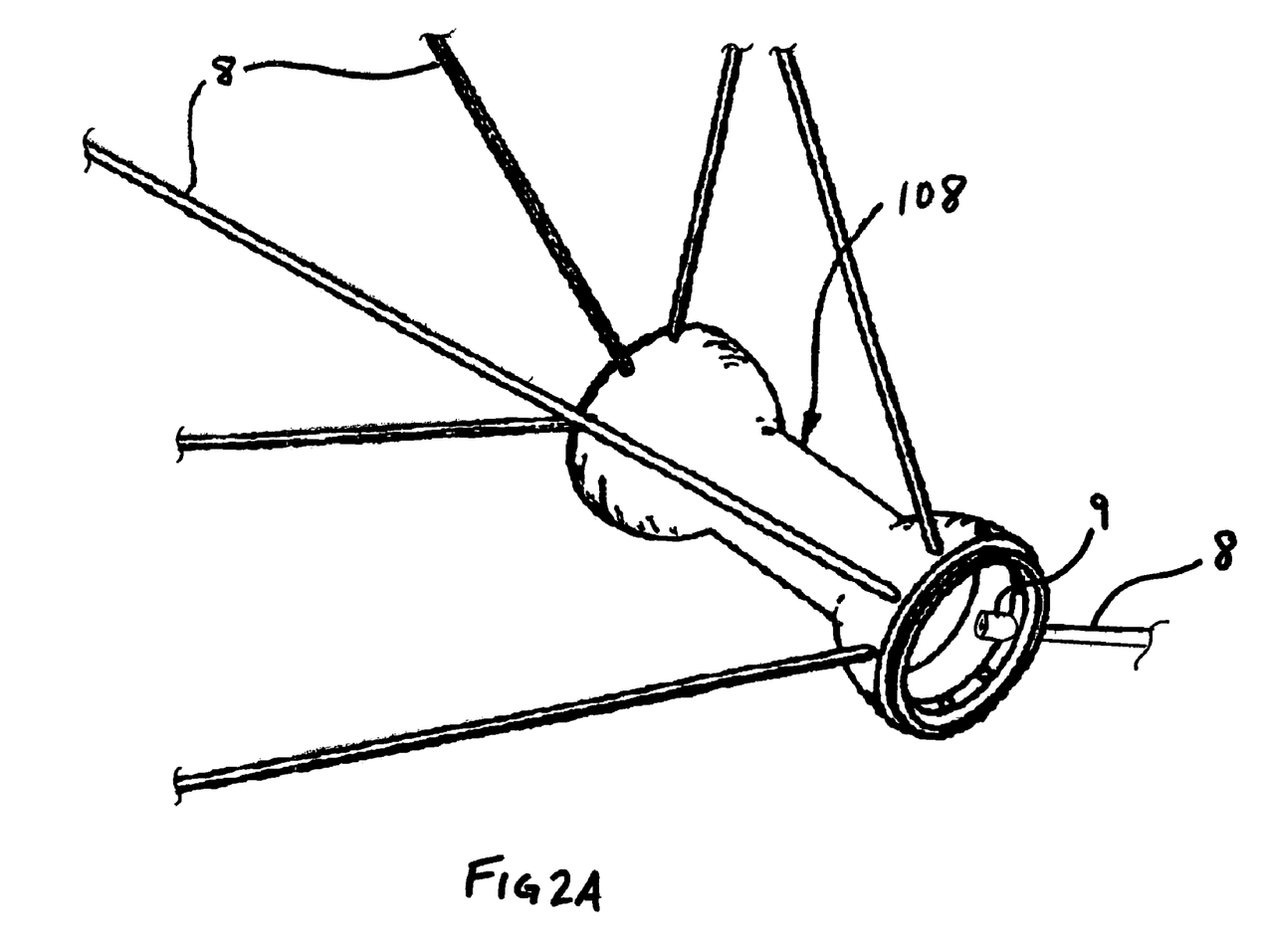
FIG. 2A illustrates an attachment system of spokes to a hub of a bicycle wheel of according to the present invention.

The spoke attachment chamber 7 is provided with a plurality of seat holes 11, each for the attachment of a spoke 8 through a spoke attachment element 9 according to the invention, described in detail hereafter. For reasons of clarity, in FIG. 1 a hub 108 of the bicycle wheel to which the opposite end of the spoke 8 is attached is not illustrated in FIG. 1, but is shown in FIG. 2A.

The upper bridge 5 of the rim 1 is also provided with a corresponding plurality of access openings 10, each at a seat hole 11, for the access of the spoke attachment elements 9 and of a maneuvering tool (not shown) to screw them onto the spokes 8 or to hold them during the attachment and adjustment of the tension of the spokes 8.

The walls 2c, 3c, 4 of the spoke attachment chamber 7 are not subject to geometric or size restrictions and can therefore be replaced with a single wall with a cross section in the shape of an arc of circumference, by two walls arranged in the form of a V, or by many walls so as to form a section more complex than the one illustrated, possibly defining many spoke attachment chambers 7. The particular section illustrated in FIG. 1 therefore is merely for illustrative and not limiting purposes of the present invention.

The seat holes 11 can be formed in the circumferentially inner wall or lower bridge 4 of the spoke attachment chamber 7 as illustrated, but they can also be formed in one or both of the circumferentially inner portions 2c, 3c of the side walls 2, 3 of the profile. Moreover, the number and distribution of the seat holes 11 can be the most various. For example, the seat holes 11 could be grouped in groups of two, three or four and/or can be formed on plural planes, other than the middle plane of the rim 1.

In a spoked wheel rim for a bicycle according to the present invention, the seat holes 11 are advantageously simple non-threaded holes, although the spoke attachment element 9 according to the invention can also be used in case the seat holes 11 are internally threaded, as well as in case there are possible rivets, provided that they have a greater diameter than the maximum size of the spoke or of a shank of the spoke attachment elements 9. The creation of non-threaded seat holes 11 is extremely simple and also lends itself particularly well to carbon fiber rims 1.

Moreover, it is not even necessary for the holes 11 to be circular shaped. They can be of whatever shape, provided that they are suitable for housing the body of a spoke 8 letting an end 81 thereof partially project into the spoke attachment chamber 7.

More specifically, each seat hole 11 has a transverse size D1 only slightly greater than the maximum transverse size D2 of the spoke 8 so as to allow the insertion of the end 81 of the spoke into the seat hole 11, from the radially inner side of the rim (in other words from below in the view of FIG. 2) and the arrangement of the spoke 8 along the intended direction, typically deviated with respect to the direction of a geometric radius of the wheel due to the attachment position of the spoke 8 to the hub.

The size D1 of the seat holes 11 can be kept only slightly greater than the maximum transverse size D2 of the spoke 8 thanks to the fact that the spoke attachment element 9 according to the invention, as better discussed hereafter, is of the nut type, i.e. without a shank suitable for extending outside of the rim, as is conversely preferred in the field in order to be able to adjust the tension of the spoke 8 from the radially inner side of the rim 1, i.e. with assembled tire.

The lower bridge 4 of the spoke attachment chamber 7 (or other wall of the chamber in which the seat holes 11 are formed) can, at each seat hole 11, be in the shape of a spherical cap with the concavity facing towards the tire coupling channel 6.

According to the invention, the access openings 10 are simple non-threaded holes of a transverse size D3 only slightly greater than the maximum transverse size D4 of the spoke attachment element 9, so as to allow the insertion of the spoke attachment element 9 in the spoke attachment chamber 7, from the radially outer side of the rim (in other words from above in the view of FIG. 2) and its arrangement in abutment about the seat hole 11.

The size D3 of the access openings 10 can be kept only slightly greater than the maximum transverse size D4 of the spoke attachment element 9 thanks to the particular configuration thereof, which does not foresee a configuration of the outer surface as a right hexagonal prism as is, conversely, known in the field for engagement of a box wrench-type maneuvering tool.

Figure 3:
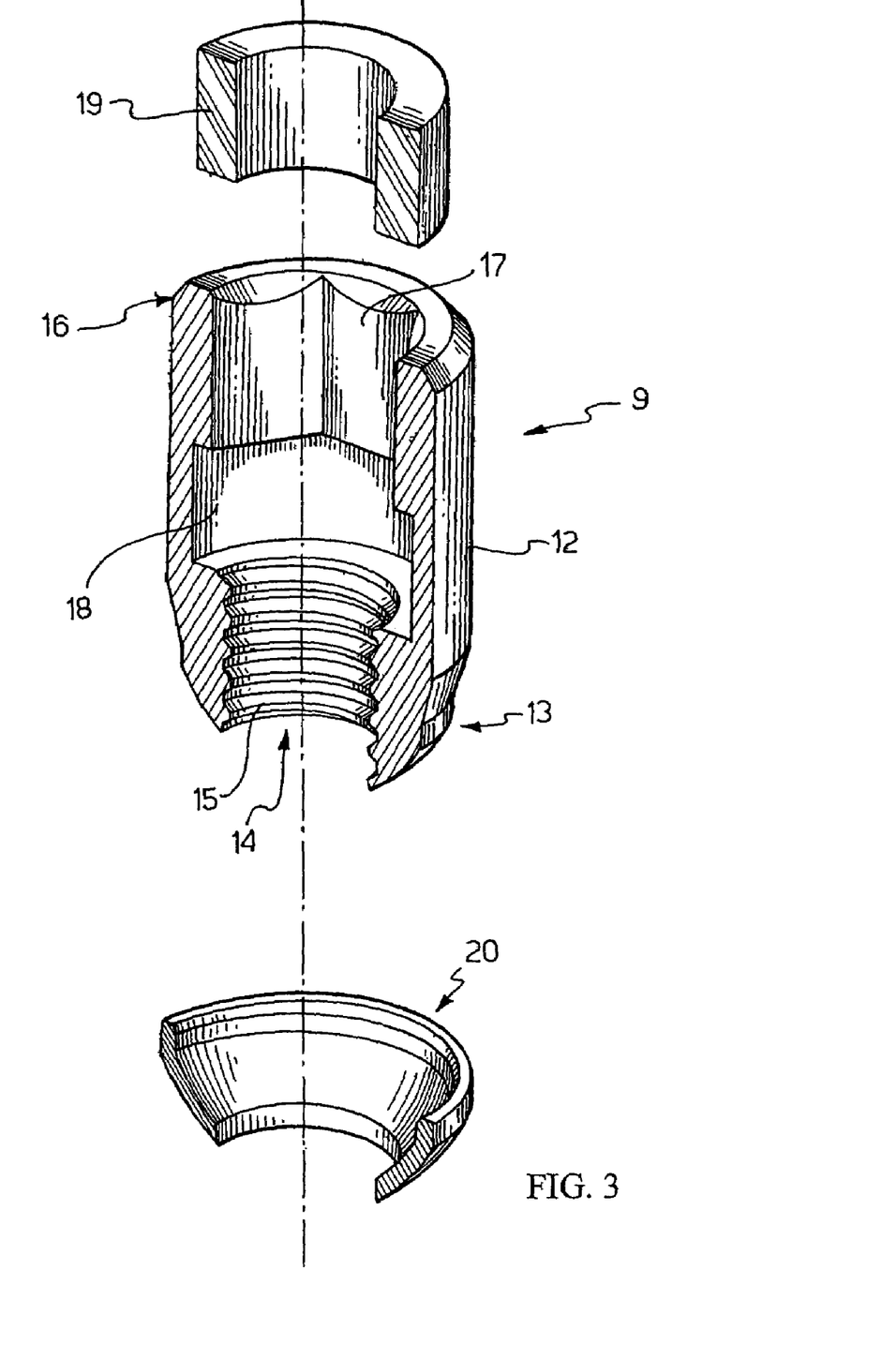
FIG. 3 illustrates an exploded and cut-away perspective view of a spoke attachment element according to a first embodiment of the present invention.

The spoke attachment element 9 according to the embodiment of the invention represented in FIGS. 1 and 2, better illustrated in the exploded view of FIG. 3, comprises an essentially cylindrical body 12 of maximum transverse size D4, as stated above greater than that of the seat hole 11 for abutment about the seat hole 11 at a first end 13 of the body 12.

An axial hole 14 extends in the body 12 of the spoke attachment element 9 from the first end 13.

The axial hole 14 is provided with an inner threading 15 extending for a first portion of its length, matching an outer threading made at the end 81 of the spoke 8 (see FIG. 1).

At its opposite end or second end 16, the body 12 of the spoke attachment element 9 has a recessed hexagonal seat 17 for engagement with a maneuvering tool. It can immediately be understood that the maximum transverse size D5 of the recessed hexagonal seat 17 corresponds to the size of the tip of a tool of the type for screws with a recessed hexagonal head, or Allen wrench.

Therefore, it shall be understood that the access opening 10 formed in the upper bridge 5 of the rim 1 according to the invention can, as stated, have a transverse size D3 only slightly greater than the maximum transverse size D4 of the spoke attachment element 9, such a size being sufficient not only to allow the insertion of the spoke attachment element 9 in the spoke attachment chamber 7, but also the insertion of such a maneuvering tool.

Otherwise, should the outer surface of the spoke attachment element 9 be hexagonally shaped for engagement of a maneuvering tool of the box or socket wrench type, like in the case of the spoke attachment elements of the prior art, the access opening 10 would have a much greater transverse size than the maximum transverse size D4 of the spoke attachment element 9, in order to allow the insertion of such a box wrench which engages the spoke attachment element from the outside.

As an alternative to the recessed hexagonal seat 17, a square or polyhedral recessed seat with whatever number of sides may be provided.

In an axially intermediate position of the body 12, more specifically in the portion extending between the threaded portion 15 of the axial hole 14 and the portion in which the recessed hexagonal seat 17 is formed, the spoke attachment element 9 further comprises an undercut annular seat 18.

A plastically deformable ring 19, for example made of NBR rubber or silicon rubber or NYLON, can be inserted in the undercut annular seat 18 of the spoke attachment element 9.

Finally, a brass for abutment on the rim 20 is removably associated with the first end 13 of the body 12 of the spoke attachment element 9, so as to be placed between the spoke attachment element 9 and the rim 1 and to reduce the friction between them.

Preferably, the abutment brass 20 is shaped as a bored spherical cap, so as to ease the orientation of the spoke attachment element 9 along the intended assembly direction of the spoke 8, a direction which typically deviates from the direction of a geometric radius of the wheel.

The assembly of the spoke 8 to the rim 1 through the spoke attachment element 9 takes place in the following way.

If desired, the plastically deformable ring 19 is inserted in the undercut annular seat 18 of the spoke attachment element 9. The end of the spoke 8 is inserted into the seat hole 11 from the radially inner side of the rim 1 (in other words from below in FIG. 2). Then, the spoke attachment element 9 is aligned with the spoke 8, upon interposition of the abutment brass 20 if desired. The tip of an Allen wrench is then inserted in the recessed hexagonal seat 17 of the spoke attachment element 9 and a torque is applied to cause the screwing in of the threaded end 81 of the spoke 8 in the internally threaded portion 15 of the spoke attachment element 9.

The spoke 8 can already be fastened, at its opposite end, to a hub of the wheel, or else it can be fastened to the hub after a first partial screwing.

The screwing of the threaded end 81 of the spoke 8 into the internally threaded portion 15 of the spoke attachment element 9 causes the body 12 of the attachment element 9 to come in abutment on the rim 1 and the tensioning of the spoke 8 between the rim 1 and the hub of the wheel.

When the spoke 8 has been completely screwed into the portion of the axial hole 14 provided with the inner threading 15, a further screwing movement causes the penetration and the threading of the plastically deformable ring 19. The penetration of the plastically deformable ring 19 by the outer threading of the spoke 8 allows a stronger attachment with the attachment element 9 to be accomplished and prevents the unscrewing of the spoke 8 due to vibrations in use of the bicycle.

In this respect, it is preferable for the plastically deformable ring 19 to be internally smooth before the assembly of the spoke. However, it is possible to provide an inner threading of the plastically deformable ring 19 that is contiguous and identical to the inner threading 15 of the body 12 of the spoke attachment element 9, or in any case in the plastically deformable ring 19 there is such a threading upon assembly of the spoke 8.

Moreover, the arrangement according to the invention of the plastically deformable ring 19 in an intermediate position of the spoke attachment element 9 eases the self-threading thereof by the spoke 8, since it is possible to apply the necessary thrust in the axial direction without the ring 19 being able to come out from the spoke attachment element 9 as it could happen if it were housed in close proximity to the end of the body 12 of the spoke attachment element 9.

Furthermore, by providing that the plastically deformable ring 19 is housed in an intermediate position of the spoke attachment element 9, it is more protected against atmospheric agents.

In the spoke attachment element 9 according to the embodiment just described, in which the plastically deformable ring 19 is housed in the undercut annular seat 18 adjacent to the threading 15, it fully carries out its action only if the spoke 8 is fully screwed in, as it happens in the case of a barrel-type coupling, i.e. where the length of the threaded end 81 of the spoke 8 is equal to the length of the threading 15 and of the undercut annular seat 18 of the spoke attachment element 9, and the adjustment of the tension of the spoke 8 takes place at its opposite end, on the hub of the wheel. However, in case one wishes to accomplish a nipple-type coupling, the engagement area of the spoke 8 with the plastically deformable ring 19 is dependent upon the tension adjustment point and can be too small in length or even of zero length if the screwing depth of the spoke 8 in the spoke attachment element 9 is short.

Figure 4:
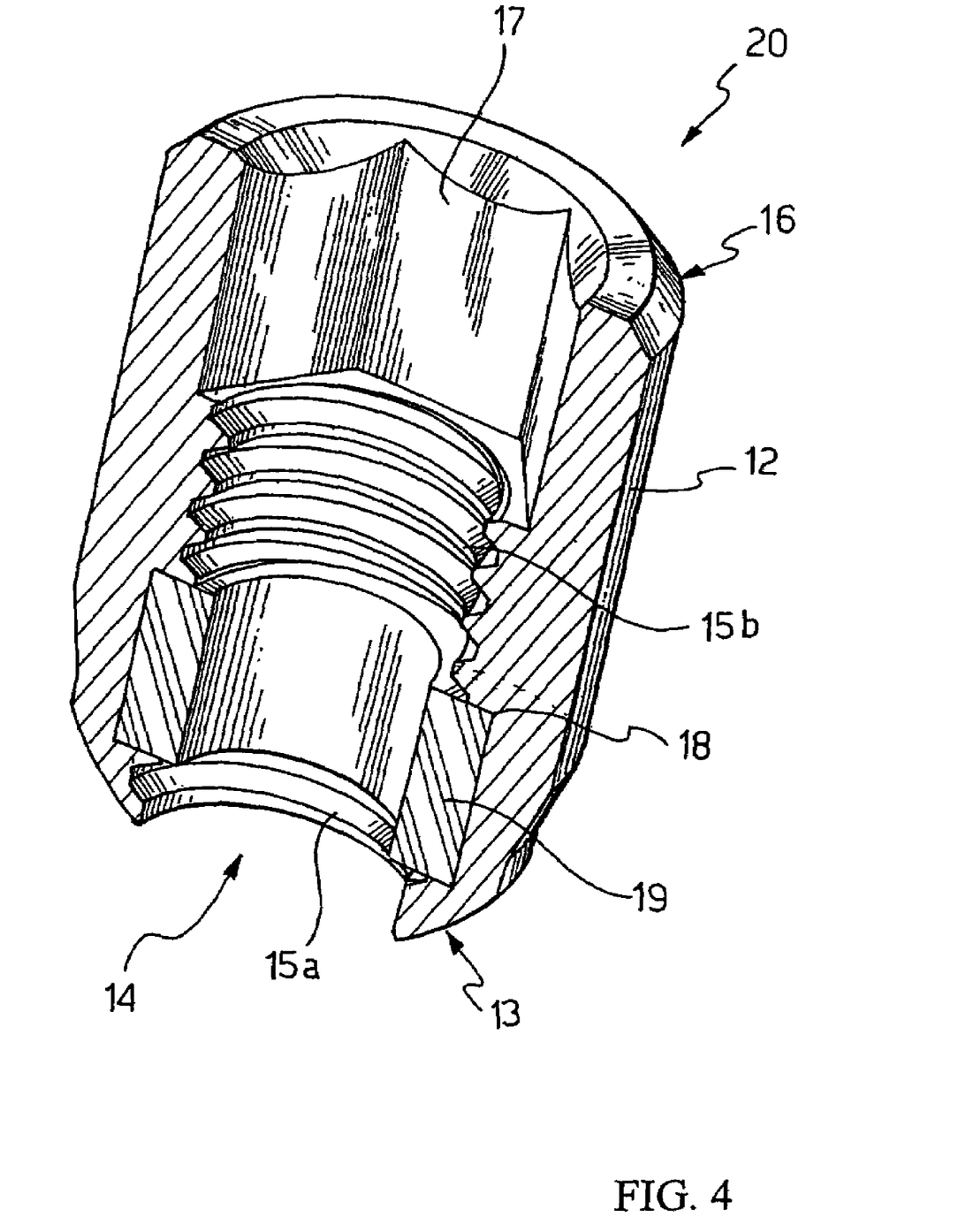
FIG. 4 illustrates a cut-away perspective view of a spoke attachment element according to a second embodiment of the present invention.

FIG. 4 shows an embodiment of a spoke attachment element 20 according to the invention in which the undercut annular seat 18 for the plastically deformable ring 19 is formed in the body 12 at an intermediate position along the threading 15 of the axial hole 14, which is therefore defined by a first portion 15a and a second portion 15b.

In this embodiment, the plastically deformable ring 19 is particularly effective since its action is not dependent upon the screwing depth of the spoke 8 in the spoke attachment element 20, and thus is not dependent upon the tension of the spoke 8. Such a spoke attachment element 20 is therefore particularly suitable for accomplishing a nipple-type coupling.

Figure 5:
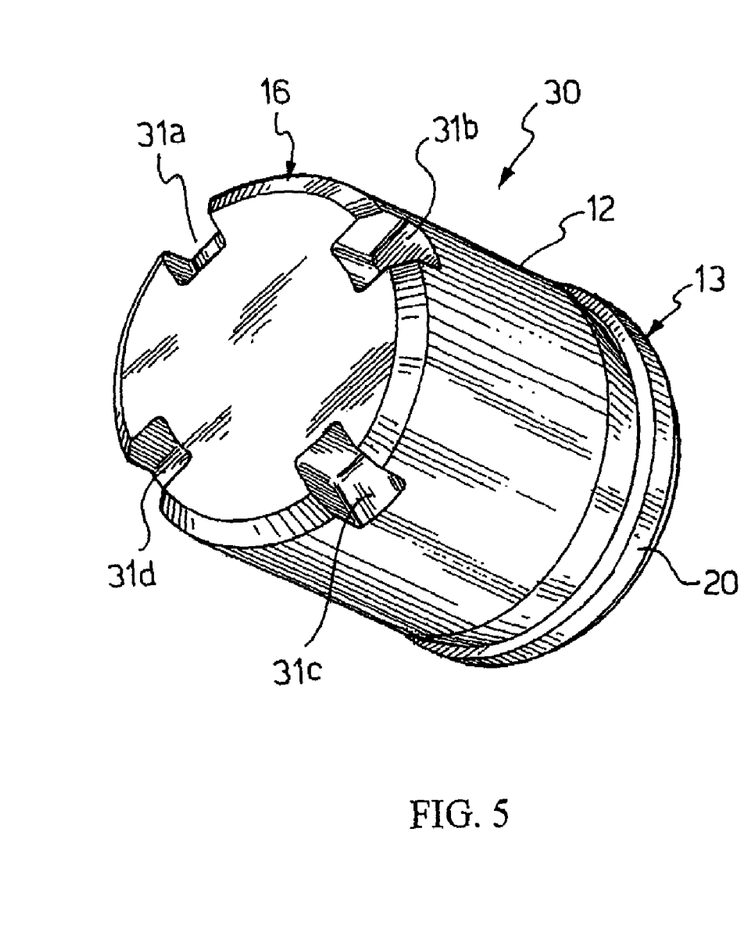
FIGS. 5 and 6 illustrate a spoke attachment element according to a third embodiment of the present invention, respectively in a perspective view and in a cut-away perspective view.
Figure 6:
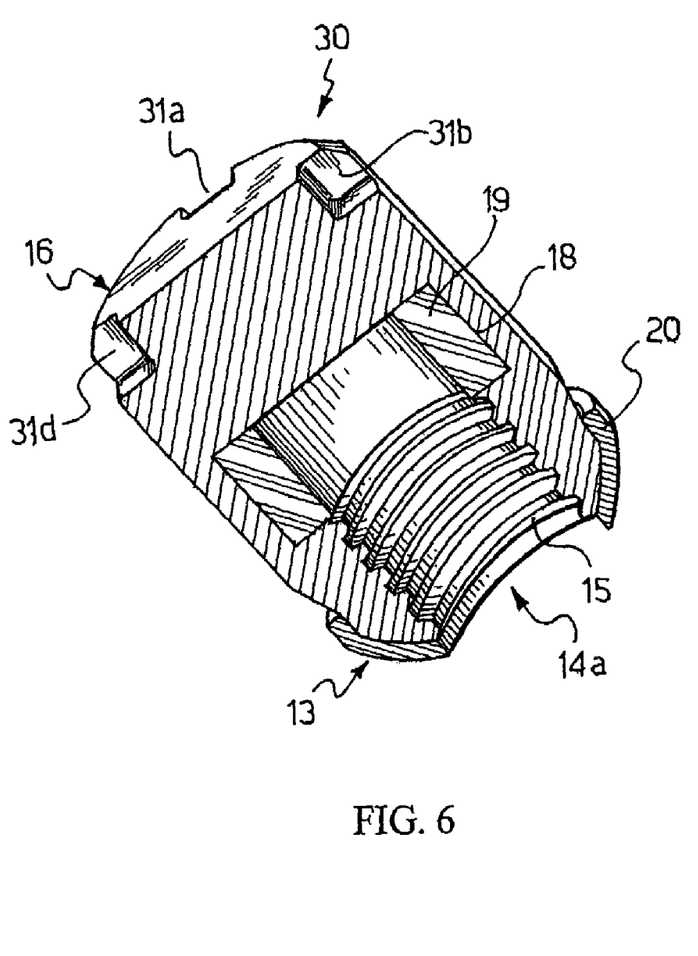

FIGS. 5 and 6 illustrate a spoke attachment element 30 according to a third embodiment of the present invention, respectively in a perspective view and in a cut-away perspective view. The spoke attachment element 30 differs from the spoke attachment element 9 according to the first embodiment since the seat for the engagement of the maneuvering tool comprises an ordered arrangement of recesses 31a, 31b, 31c, 31d along the periphery of the surface of the body 12 at its second end 16. Moreover, in the spoke attachment element 30 according to the third embodiment, the axial through hole 14 is replaced by a blind axial hole 14a, having the inner threading 15.

Figure 8:
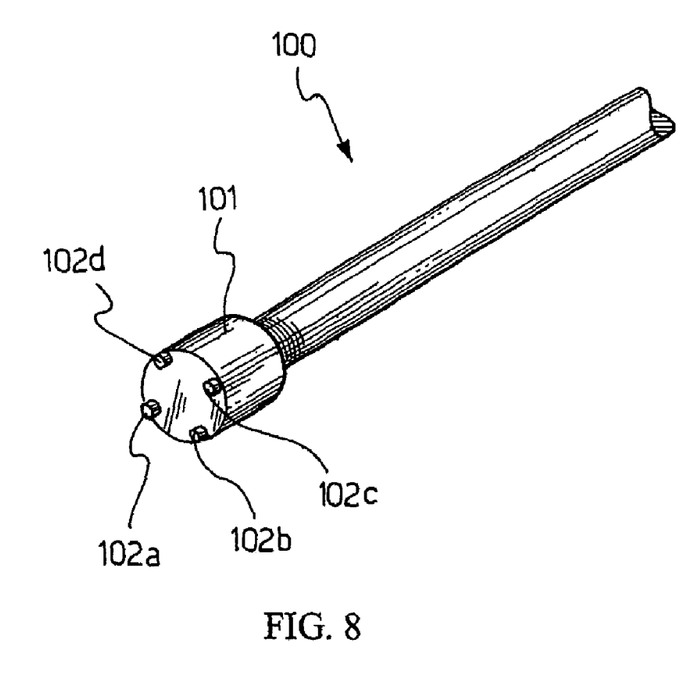
FIG. 8 illustrates a partial perspective view of a maneuvering tool for the spoke attachment element of FIG. 7, and FIGS. 9 to 13 illustrate perspective views of alternative embodiments of a spoke attachment element according to the present invention.

The spoke attachment element 30 according to this embodiment can be maneuvered through a tool with a cross-shaped tip, similar to that of the subsequent FIG. 8.

Figure 7:
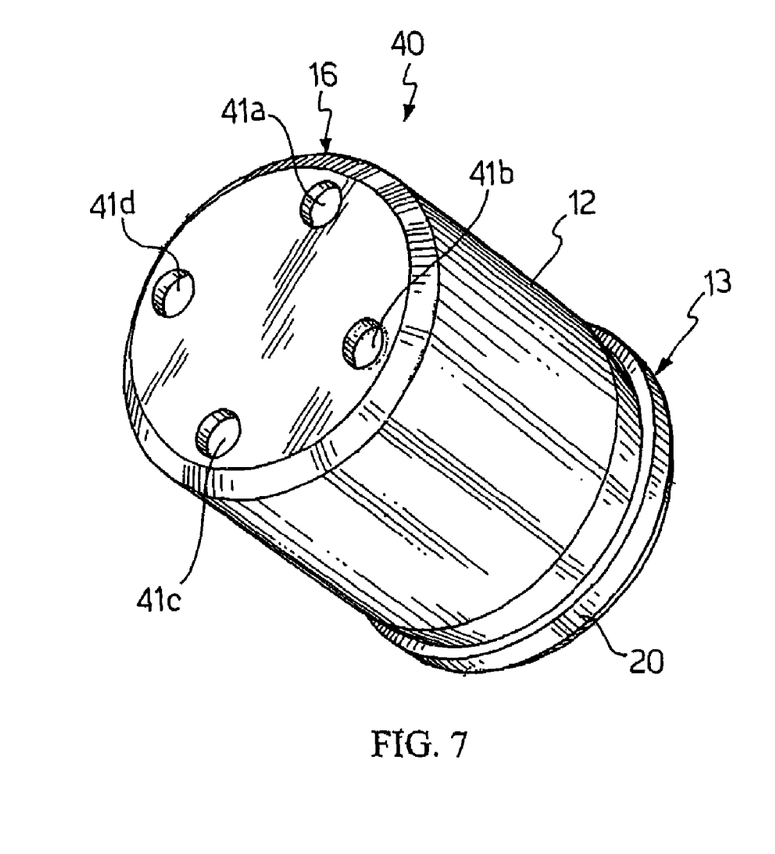
FIG. 7 illustrates a perspective view of a spoke attachment element according to a fourth embodiment of the present invention.

FIG. 7 illustrates a perspective view of a spoke attachment element 40 according to a fourth embodiment of the present invention, which differs from the spoke attachment element 30 according to the third embodiment since the recesses 41a, 41b, 41c, 41d which create the tool engagement seat are circular and are entirely formed in the face of the second end 16 of the body 12.

The spoke attachment element 40 according to this embodiment can be maneuvered through a tool 100, partially illustrated in FIG. 8, which has a cross-shaped tip 101 with cylindrical lugs 102a, 102b, 102c and 102d.

Figure 9:
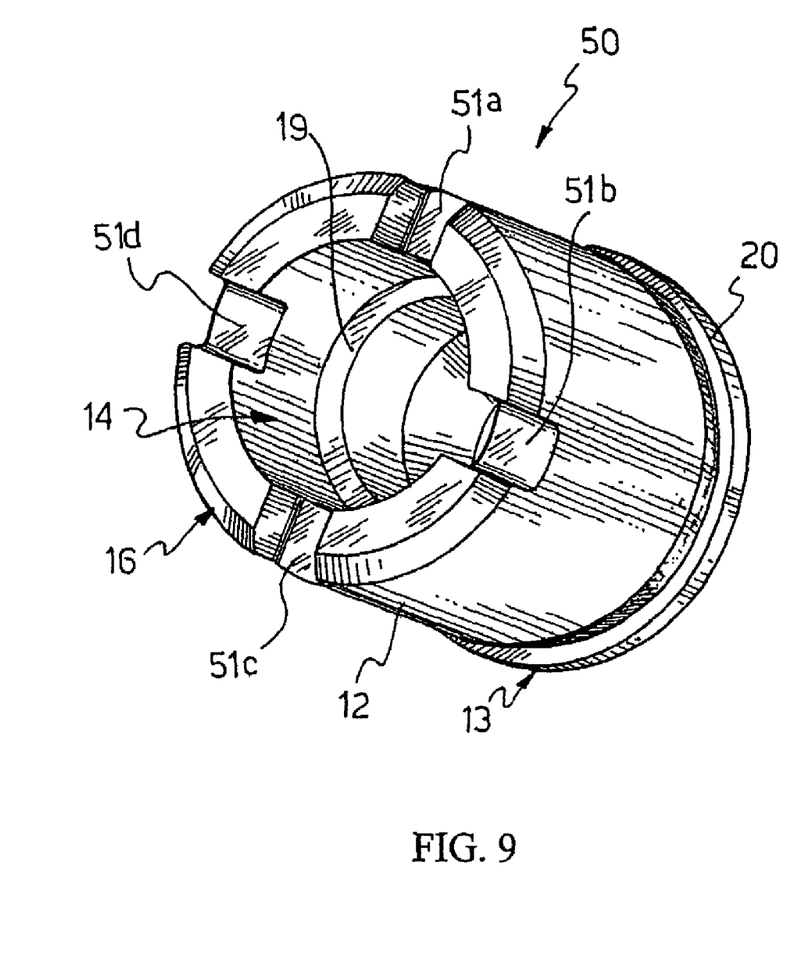

FIG. 9 illustrates a perspective view of a spoke attachment element 50 according to a fifth embodiment of the present invention, in which the axial hole 14 is a through hole and the tool engagement means consists of a pair of diametric notches 51a, 51b formed in the annular surface of the second end 16 of the body 12.

The spoke attachment element 50 according to this embodiment can be maneuvered through a screwdriver with a flat-tip or a cross-shaped tip. It should be noted that the screwdriver does not damage the plastically deformable ring 19 thanks to the arrangement thereof in an axially intermediate position of the body 12.

Figure 10:
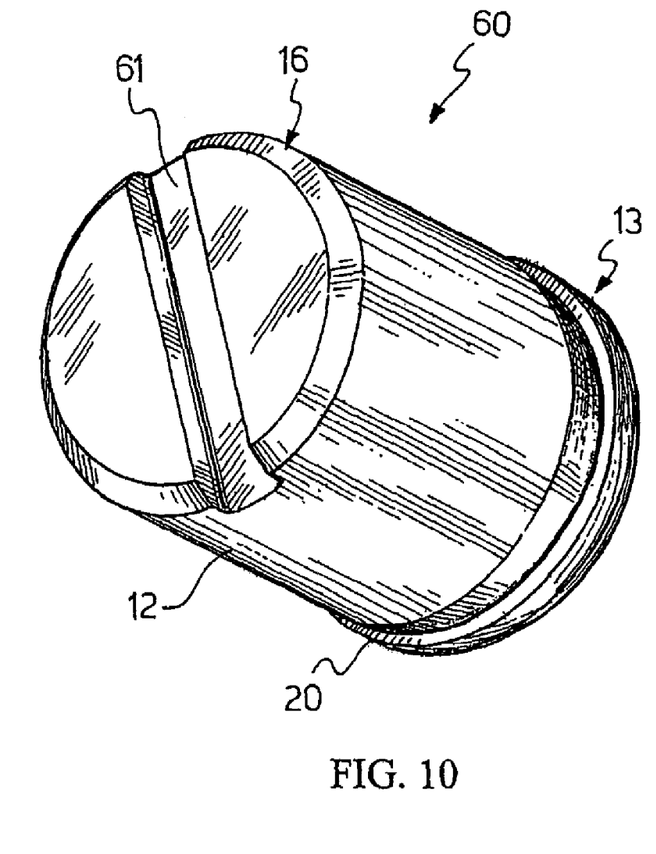

FIG. 10 illustrates a spoke attachment element 60 according to a sixth embodiment of the present invention, in which the axial hole for receiving the end of the spoke is blind (not visible in FIG. 10) and the seat for engagement of a screwdriver, with a flat tip, comprises a diametric notch 61 on the face of the second end 16 of the body 12.

Figure 11:
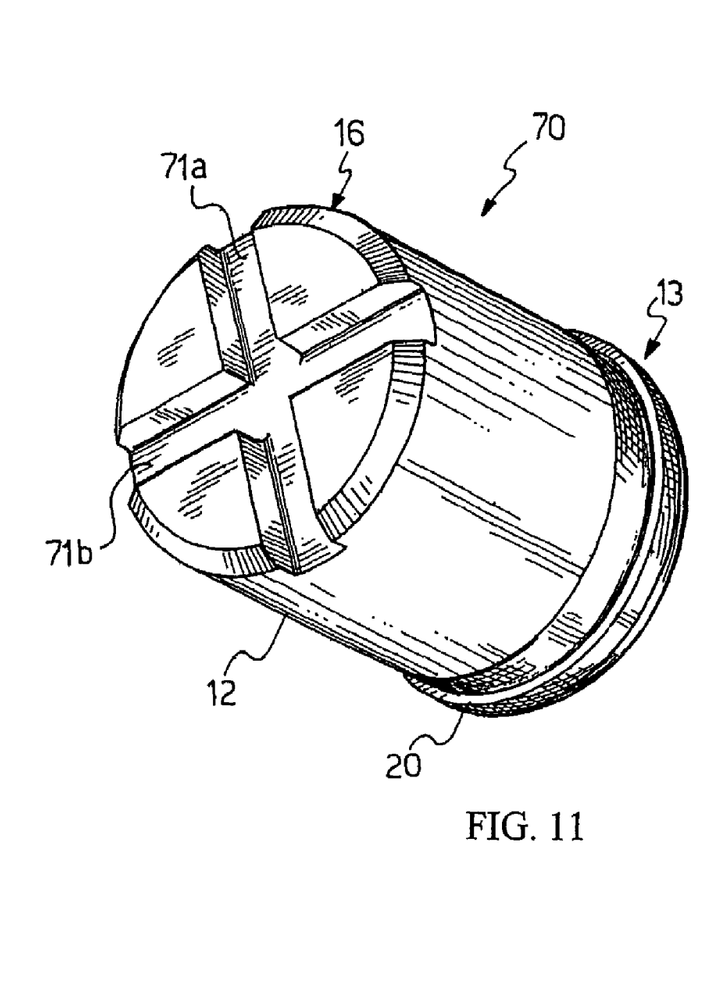

FIG. 11 illustrates a spoke attachment element 70 according to a seventh embodiment of the present invention, analogous to the spoke attachment element 60 of the sixth embodiment, but in which on the face of the second end 16 of the body 12 a pair of diametric notches 71a, 71b is formed for engagement of a cross-shaped tip screwdriver.

Figure 12:
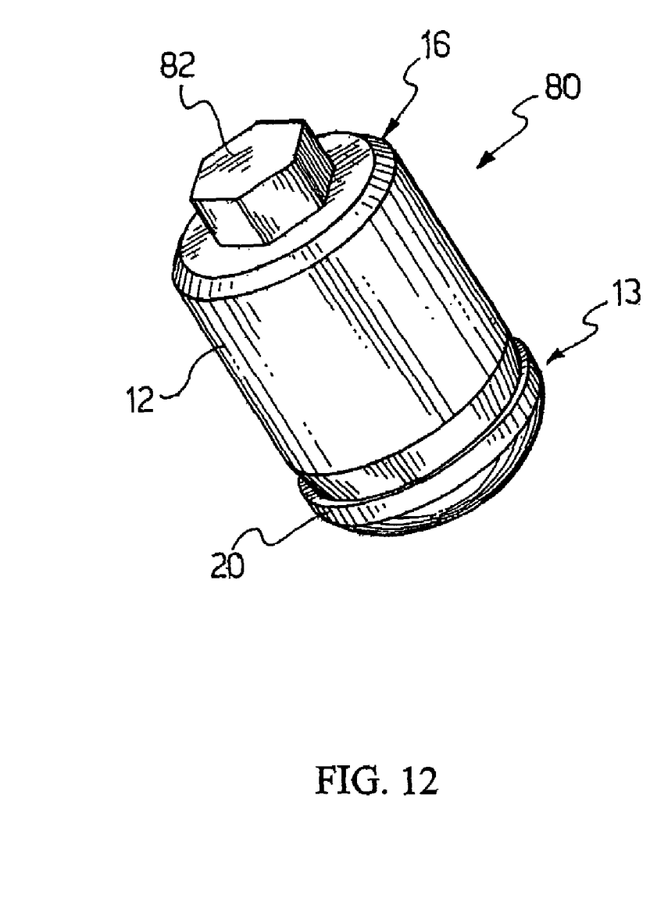

FIG. 12 illustrates a spoke attachment element 80 according to an eighth embodiment of the present invention, in which the axial hole for receiving the end of the spoke is blind (not visible in FIG. 12) and a projecting hexagonal protrusion 82 is provided on the face of the second end 16 of the body 12.

The spoke attachment element according to this embodiment can be maneuvered through a box or socket wrench tool, however of a substantially lower dimension than a box wrench that would be necessary if the hexagonal configuration were made on the side surface of the entire body 12 of the spoke attachment element. Alternatively, the protrusion 82 could have a square or polygonal cross section with whatever number of sides.

Further alternative embodiments within the scope the present invention comprise an ordered peripheral arrangement of protrusions on the face of the second end 16 of the body 12 of the spoke attachment element, for use with a maneuvering tool having a tip with an ordered arrangement of matching recesses. For example, the configuration of the spoke attachment element 40 of FIG. 7 and of the respective maneuvering tool 100 of FIG. 8 could be inverted. The provision of projecting protrusions on the spoke attachment element instead of recessed seats can be advantageous since conventional tools, conveniently small, smaller than those of the prior art, can be used.

It should be noted that in all of the embodiments of spoke attachment elements according to the invention, the tip of the maneuvering tool, when engaged on the second end 16 of the spoke attachment element, does not transversally project from its body 12. In other words, in all of the embodiments the transverse size D3 of the access openings in the upper bridge 5 of the rim 1 must be only slightly greater than the maximum transverse size D4 of the spoke attachment element, which is defined by the side surface of its body 12 or by portions of the side surface other than the tool engagement surfaces.

Figure 13:
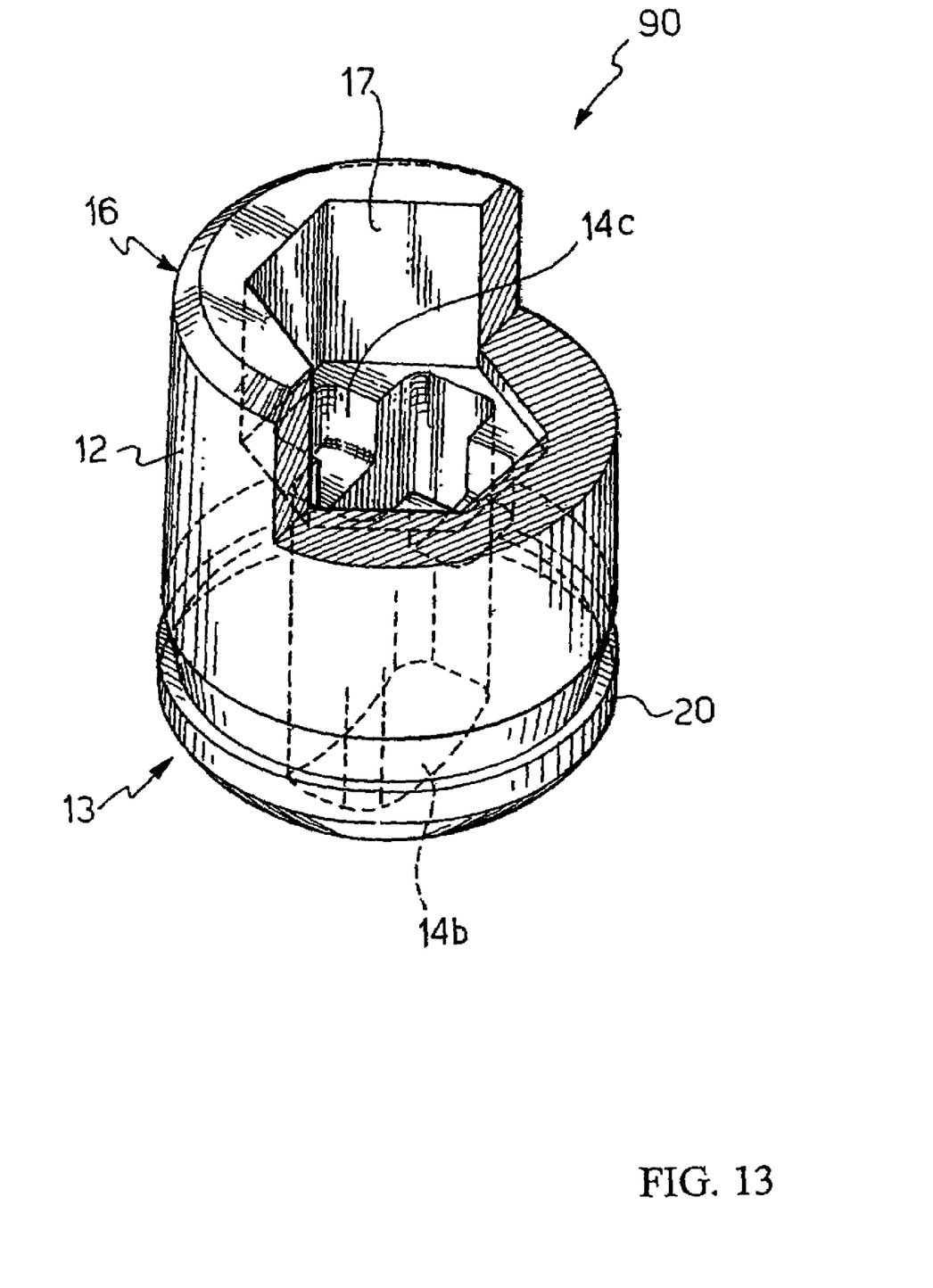

Finally, FIG. 13 illustrates a spoke attachment element 90 according to a ninth embodiment of the present invention, in a partially cut-away perspective view.

The spoke attachment element 90 according to this embodiment differs from the spoke attachment element 9 according to the first embodiment in that it has an axial hole 14b that is neither circular nor provided with an inner threading. The axial hole 14b, on the other hand, has a cross section of a shape matching a projecting head of a spoke (not shown), for example rectangular as illustrated. At the end of the axial hole 14b on the side of the second end 16 of the spoke attachment element 90, a seat 14c is made of a shape matching the projecting head of the spoke, undercut with respect to the axial hole 14b. The axial hole 14b is therefore configured for bayonet engagement of the end of the spoke provided with the projecting head, in such a way accomplishing a barrel-type coupling.

Such an axial hole 14b for bayonet engagement of the end of the spoke provided with the projecting head can replace the hole 14 having the inner threading 15 also in the other embodiments of spoke attachment element shown in FIGS. 3 to 12.

It should be understood that in case the spoke attachment element of the invention comprises such an axial hole 14b for bayonet engagement of the end of the spoke provided with the projecting head, the assembly of the spoke typically takes place first of all at the rim and then at the hub 108, wherein a threaded end of the spoke and an internally threaded seat hole shall be provided in the hub 108 or in a second spoke attachment element 9, as shown in FIG. 2A. Also in such a case, since the barrel-type attachment element and the spoke are made rotationally integral thanks to the engagement of the projecting head of the spoke in the seat of the attachment element, for example in the seat 14c, the application of a torque through a suitable maneuvering tool on the barrel-type attachment element in any case allows rotation of the spoke with respect to the threaded seat hole at the hub, and therefore adjustment of the tension of the spoke.

To provide a purely illustrative size indication, the size at the threaded end of the spoke is between 2 and 3 mm in the case of steel spokes, whereas it is between 4 and 6 mm in the case of aluminum spokes.

It should be understood that although the spoke attachment element has been illustrated and described for use at the rim of a bicycle wheel, in particular a rim having an upper partition bridge between a spoke attachment chamber and a tire coupling channel, it has broader applications. Indeed, the spoke attachment element of the invention can equally be used with single channel bicycle rims, or else it can be used for attachment at the hub 108, as shown particularly in FIG. 2A, which shows one hub for use with the invention, although it should be understood that other hubs could also be used with the spoke attachment element 9.

The spokes of a bicycle wheel can extend in a substantially radial direction, and in such a case the end on the hub side typically has a head housed in a seat formed in a front surface of the hub, whereas the end on the rim side has an outer threading. Alternatively, the spokes can be attached to flanges radially extending from the hub and can therefore take up a direction that deviates from the radial direction, being tangentially attached to the hub. The spoke attachment element of the invention is particularly suitable for tangential assembly to the hub, at one of the aforementioned flanges radially extending from the hub.

It should also be understood that the arrangement of the plastically deformable ring 19 in an intermediate position along the threading of the spoke attachment element as illustrated in FIG. 4, and more generally its arrangement at an axially intermediate position of the body 12 of the spoke attachment element, like for example in the spoke attachment element 9 of FIG. 3, constitutes an inventive aspect per se in view of the substantial advantages that such arrangements bring about, discussed above, and can also be actuated in an attachment element of the shank type (not shown) in which the axial hole 14 or 14a provided with the threading 15 extends through the shank. Given that this inventive aspect is per se advantageous, in the case of such a shank-type attachment element, the outer surface of the head can be hexagonal, square or otherwise shaped for engagement with the maneuvering tool of the box wrench type, as known in the prior art.

The invention claimed is:

1. An element for the attachment of a spoke in a bicycle wheel at a seat hole, the element comprising:
   a body of greater transverse size than that of the seat hole for abutment about the seat hole at a first end of the body;
   an axial hole extending from the first end in said body, having means for engagement with a spoke and an undercut annular seat in said axial hole of the body, wherein said axial hole has an inner threading extending for at least one axial portion thereof;
   a plastically deformable annular element housed in the undercut annular seat; and
   surface tool engagement means at a second end of said body opposite said first end;
   wherein the maximum transverse size of said body is defined by side surface portions of said body other than tool engagement surfaces.

2. The spoke attachment element of claim 1 wherein said plastically deformable annular element comprises an inner threading contiguous and identical to the threading of the axial hole.

3. An element for the attachment of a spoke in a bicycle wheel at a seat hole, the element comprising:
   a body of greater transverse size than that of the seat hole for abutment about the seat hole at a first end of the body,
   an axial hole extending from the first end in said body, having means for engagement with a spoke,
   surface tool engagement means at a second end of said body opposite said first end, and
   a brass for abutment about the seat hole, removably associated with the first end of the body,
   wherein the maximum transverse size of said body is defined by side surface portions of said body other than tool engagement surfaces.

4. The spoke attachment element of claim 3 wherein the abutment brass is shaped like a bored spherical cap.

5. An element for attachment of a threaded end of a spoke in a bicycle wheel at a seat hole, having a body comprising:
   an abutment surface for holding at least one portion of the body at the seat hole,
   an axial hole having an inner threading extending for at least a portion of its length,
   an undercut annular seat in said axial hole, and
   a plastically deformable annular element housed in said annular seat and having a hole coaxial with the axial hole,
   wherein said undercut annular seat is in an axially intermediate position of the body.

6. The spoke attachment element of claim 5 wherein the plastically deformable annular element comprises an inner threading contiguous and identical to the threading of the axial hole.

7. The spoke attachment element of claim 5 wherein said undercut annular seat is in an axially intermediate position of said inner threading.

8. The spoke attachment element of claim 5 wherein said abutment surface is an end surface of said body.

9. The spoke attachment element of claim 5 wherein said body comprises a head and a shank, the fitting surface between head and shank being said abutment surface.

10. The spoke attachment element of claim 9 wherein said undercut annular seat is in said head portion of the spoke attachment element.

11. The spoke attachment element of claim 5 wherein said abutment surface has the shape of a spherical cap.

12. The spoke attachment element of claim 5 further comprising a bored spherical cap brass at said abutment surface.

13. An element for the attachment of a spoke in a bicycle wheel at a seat hole, the element comprising:
   a body of greater transverse size than that of the seat hole for_abutment about the seat hole at a first end of the body,
   an axial hole extending from the first end in said body that is configured to engage a spoke,
   a second end of the body, opposite the first end, that is configured to engage a tool,
   a semi-spherical shaped brass for abutment about the seat hole, removably associated with the first end of the body, wherein the maximum transverse size of said body is defined by side surface portions of said body other than tool engagement surfaces.

14. An element for attachment of a threaded end of a spoke in a bicycle wheel at a seat hole, having a body comprising:
an abutment surface for holding at least one portion of the body at the seat hole,
an axial hole having an inner threading extending for at least one axial portion of its length,
an undercut annular seat in said axial hole, and
a plastically deformable annular element housed in said annular seat and having a hole coaxial with the axial hole,
wherein said undercut annular seat is in an axially intermediate position of the body.

15. An element for attachment of a threaded end of a spoke in a bicycle wheel at a seat hole, having a body comprising:
an abutment surface for holding at least one portion of the body at the seat hole,
an axial hole having an inner threading extending for at least one axial portion of its length,
an undercut annular seat in said axial hole, and
a plastically deformable annular element housed in said annular seat and having a hole coaxial with the axial hole, said hole coaxial with the axial hole comprising an inner threading contiguous and identical with the threading of the axial hole,
wherein said undercut annular seat is in an axially intermediate position of the body.

16. An element for attachment of a threaded end of a spoke in a bicycle wheel at a seat hole, having a body comprising:
a head, a shank, and a fitting surface between head and shank for holding at least one portion of the body at the seat hole,
an axial hole having an inner threading extending for at least one axial portion of its length,
an undercut annular seat in said axial hole, and
a plastically deformable annular element housed in said annular seat and having a hole coaxial with the axial hole,
wherein said undercut annular seat is in an axially intermediate position of the body.

* * * * *